United States Patent [19]

Kleinhans

[11] Patent Number: 5,451,012
[45] Date of Patent: Sep. 19, 1995

[54] ASSEMBLY FOR FASTENING A BELT WEBBING TO A SHAFT OF A SEAT BELT RETRACTOR

[75] Inventor: Klaus Kleinhans, Schwäbisch Gmünd, Germany

[73] Assignee: TRW Repa GmbH, Alfdorf, Germany

[21] Appl. No.: 219,630

[22] Filed: Mar. 29, 1994

[30] Foreign Application Priority Data

Apr. 6, 1993 [DE] Germany ............ 9305244 U

[51] Int. Cl.⁶ .................................. B65M 75/28
[52] U.S. Cl. .................................. 242/587.1
[58] Field of Search ........... 242/587.1, 587.2, 587.3; 280/804; 297/475, 482

[56] References Cited

U.S. PATENT DOCUMENTS

| | | | |
|---|---|---|---|
| 3,291,416 | 12/1966 | Gionta | 242/587.1 |
| 3,802,641 | 4/1974 | Saito | 242/587.2 |
| 4,008,863 | 2/1977 | Fohl | 242/587.2 |
| 4,119,281 | 10/1978 | Paitula et al. | |
| 4,254,921 | 3/1981 | Adomeit | 242/587.1 |
| 4,256,273 | 3/1981 | Burleigh | |
| 4,623,104 | 11/1986 | Mori | 242/587.1 |
| 4,687,253 | 8/1987 | Ernst et al. | 242/587.2 |
| 4,693,432 | 9/1987 | Tourret | 242/587.2 |
| 4,967,976 | 11/1990 | Kawai et al. | 242/587.2 |
| 5,002,236 | 3/1991 | Cotter | 242/587.1 |
| 5,014,927 | 5/1991 | Ogawa et al. | 242/587.1 |
| 5,065,953 | 11/1991 | Schmid et al. | |

FOREIGN PATENT DOCUMENTS

| | | | |
|---|---|---|---|
| 2401671 | 3/1979 | France . | |
| 2343914 | 3/1975 | Germany . | |
| 2802031 | 7/1979 | Germany | 242/587.3 |
| 2174590 | 11/1986 | United Kingdom . | |

Primary Examiner—John P. Darling
Attorney, Agent, or Firm—Tarolli, Sundheim & Covell

[57] ABSTRACT

An assembly for fastening a belt webbing (10) to a shaft (12) of a seat bealt retractor is provided. The shaft has a radial slot (18) through which one end of said belt webbing (10) is inserted. The belt webbing has a first section (101) for insertion in the slot (18) and a second section (102) for wrapping around a rod (14, 16) oriented transversly to the longitudinal direction of the belt webbing (F). An end section (103) of the webbing is located parallel to the first section (101), and the rod (14, 16) is arranged in an expanded first part (181) of the slot (18) merging in a narrower second part (182) of the slot (18). The first section (101) and the end section (103) of the belt webbing (10) are held in the narrow part (182) of the slot (18) by being squeezed in the direction of the belt webbing thickness.

7 Claims, 4 Drawing Sheets

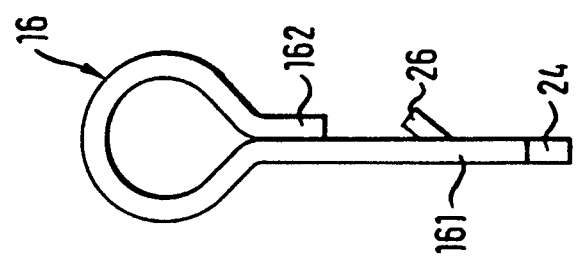
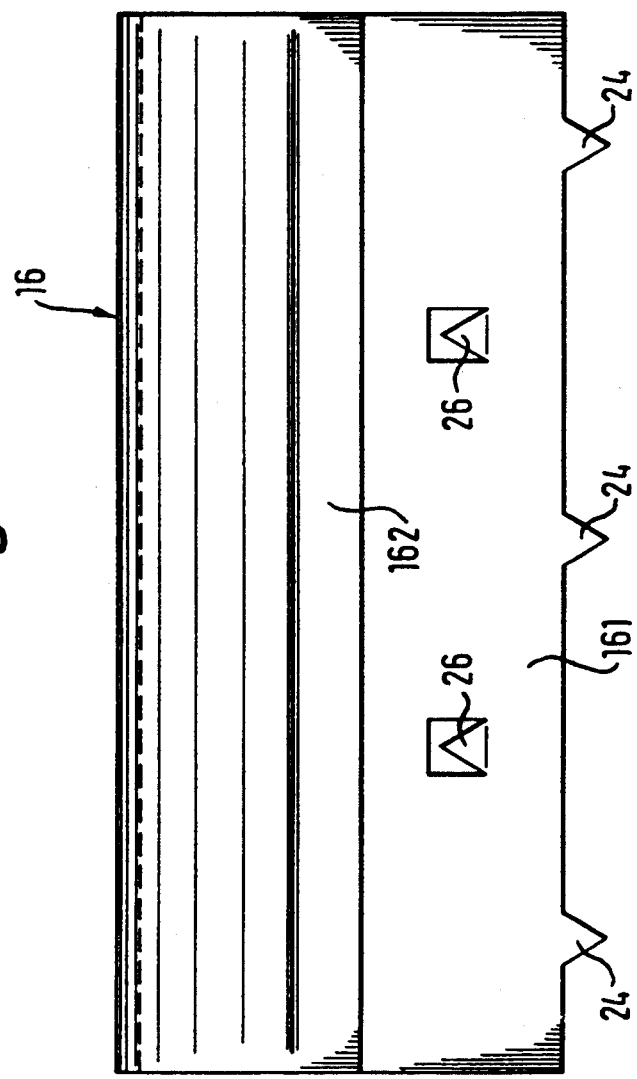

ASSEMBLY FOR FASTENING A BELT WEBBING TO A SHAFT OF A SEAT BELT RETRACTOR

The invention relates to an assembly for fastening a belt webbing to a shaft of a seat belt retractor.

Usually, the winding shaft of a retractor has a radial slot through which one end of the belt webbing is inserted. In a fastening assembly shown in U.S. Pat. No. 5,065,953, unlike other conventional belt webbing fastening assemblies, no seam in the webbing is required to secure the belt webbing to the shaft of the belt retractor. The webbing is merely held by its free end being engaged in a groove of the shaft and two turns of webbing wrapped around one of the webs defining the radial slot.

According to the present invention an assembly is provided wherein at least two sections of the belt webbing are held in a narrow part of the radial slot by being squeezed in the direction of the belt webbing thickness, whereby the pulling-out force of the belt webbing from the slot of the shaft is increased. In addition to the friction achieved by wrapping of the belt webbing around a transverse holding member a squeezing force is now effective in the narrow part of the slot to hold the belt webbing in addition to the wrapping engagement.

This squeezing force may be simply produced in particular by introducing at least one spreader member in the narrower part of the slot to press the belt webbing coactive with the wall defining the slot in the second part. This spreader member squeezes the belt webbing correspondingly elastically so that movement of the belt webbing in the slot is prevented.

Basically two different versions are useful as advantageous embodiments of the spreader member.

In accordance with the first embodiment the holding member around which the webbing is wrapped is integrally formed with a web which extends into the narrow part of the slot holding three layers of webbing in a compressed state.

In accordance with a second embodiment the belt webbing is wrapped around a bar forming a transverse member and a U-shaped clamp is engaged around the belt webbing in the slot. The belt webbing is first wrapped around the bar on installation. The U-shaped clamp is then engaged around the belt webbing so that it clasps the belt webbing wrapped around the bar. This assembly comprising belt webbing, the bar and the clamp is then simply forced into the narrow part of the slot. This can be further reinforced by providing the clamp with wedge-shaped projections on its outer surface.

In both embodiments, installation is straight forward and fastening is reliable.

Further advantageous features of the invention are disclosed by the description of the preferred embodiments of the invention with reference to the drawing in which:

FIG. 2 is a plan view of a spreader member according to a second embodiment of the invention;

FIG. 3 is a side view of FIG. 2;

Figure 1:
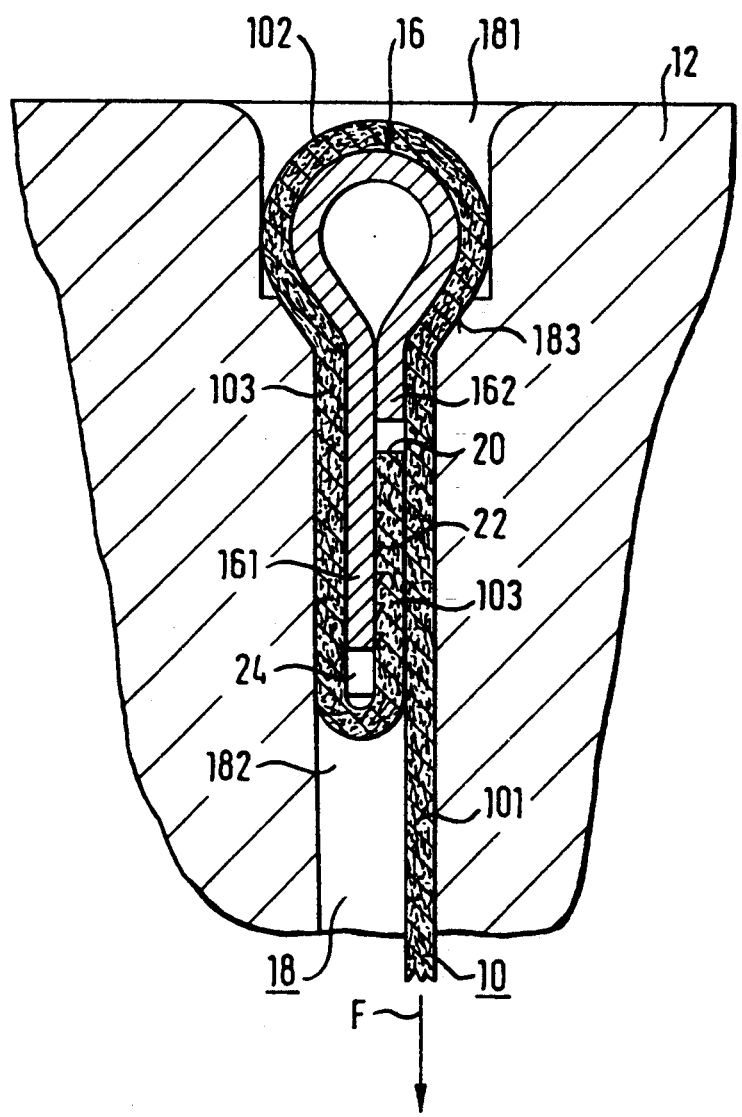
FIG. 1 is a partial cross-section view through the shaft of a belt retractor with an assembly for securing the belt webbing according to the invention in a first embodiment.

In accordance with FIG. 1 a belt webbing 10 is secured to an axle or shaft 12. Preferably the belt webbing 10 is part of a vehicle seat belt webbing and the shaft 12 is part of a belt retractor mechanism of a vehicular seat belt system. In addition to the belt webbing 10 and the shaft 12 FIG. 1 shows a spreader member 16 and a slot 18.

The radial slot 18 runs through the shaft 12 and is subdivided into a first expanded part 181, a second narrower part 182 and a tapered intermediate part 183 extending from the expanded part 181 in the direction of the narrower part 182. The spreader member 16 is wedge-shaped in the direction of the narrower part 182 of the slot 18 and has two arms 161 and 162 extending in the part 182 of the slot 18, the arm 162 being formed with a shorter extension in the narrower part 182 of the slot as compared to arm 161. The two arms 161 and 162 are located directly on each other.

The belt webbing end 20 connects the shortened arm 162 of the spreader member 16, is wrapped around the free end of the arm 162 to run in the direction of the opposite end of the spreader member 16 before in turn being wrapped around the spreader member 16 to finally pass through the slot 18 in the longitudinal direction of the belt webbing F. The belt webbing 10 thus has a first section 10 introduced into the slot 18, a second section 102 wrapping around the spreader member 16 followed by an end section 103 running parallel to the first section, the end section 103 being wrapped around the free end of the arm 161 and extending up to the free end of the shorter arm 162.

The slot width in the narrower part 182 is less than the sum of three times the thickness of the belt webbing 10 and the thickness of the arm 161 of the spreader member 16. The arm 162 of the spreader member 16 has a thickness which is less than that of the squeezed belt webbing 10. Accordingly, FIG. 1 shows the belt webbing 10 squeezed in the narrower part 182 of the slot 18.

As a means of additionally preventing the belt webbing 10 from slipping in its longitudinal direction F the surface of the spreader member 16 is provided with pointed projections 22 to counteract movement of the belt webbing in the longitudinal direction F. For this purpose the projections 22 are arranged on the side of arm 161 of the spreader member 16 on which the end 20 of the belt webbing 10 is located.

The surface of the wedge-shaped part of the spreader member 16 is parallel to the surface of the opposing tapered intermediate part 183 of the slot 18 in each case, so that when the load is applied in the longitudinal direction F of the belt webbing the spreader member 16 is pressed by the belt webbing 10 in its longitudinal direction F so that the belt webbing 10 is also squeezed in the intermediate part 183.

To further provide a reliable grip on the belt webbing 10 the surface of the spreader member 16 is provided knurled and the free end features pointed teeth 24 extending in the longitudinal direction of the belt webbing F, the shape of the pointed teeth 24 corresponding to the second embodiment of the spreader member 16 shown in the FIGS. 2 and 3.

The second embodiment of the spreader member 16 differs from the first embodiment merely by not pointed projections 22 but hooks 26 being provided similar to the pointed teeth 24. These hooks 26 are arranged inclined to the arm 161 of the spreader member 16 and counteract a movement of the belt webbing 10 in its longitudinal direction F, the hooks 26 thereby engaging the belt webbing 10.

Figure 5:
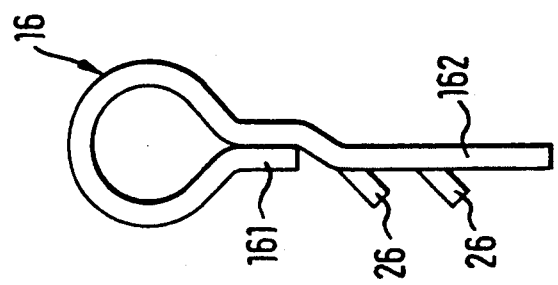
FIG. 5 is a side view of FIG. 4.
Figure 4:
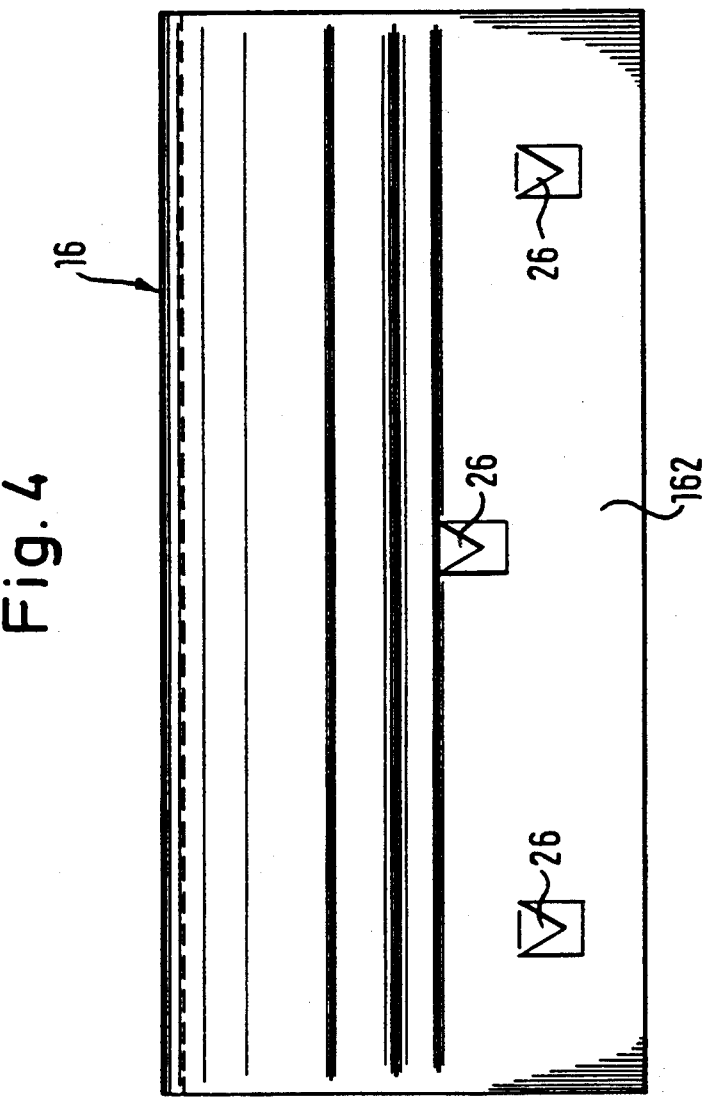
FIG. 4 is a plan view of a spreader member according to a third embodiment of the invention.

A third embodiment of a spreader member 16 is shown in FIGS. 4 and 5. Here, for one thing, the spreader member 16 differs from that of the first embodiment by the arm 161 being configured shorter and the longer arm being arm 162. In this arrangement the arm 162 is formed in such a way in the direction of the first arm 161 that the end region of the arm 162 is in alignment with the arm 161. For another thing, no projections 24 are provided. The belt webbing 10 (not shown for a simple representation) runs as shown in FIG. 5 from the free end of the arm 162 on the left-hand side of the arm 162 in the direction of the opposite end of the spreader member 16, around this and then in the longitudinal direction of the belt webbing F. This is why the hooks 26 are arranged on the other side of the arm 162 and inclined in the opposite direction. A further special feature of this embodiment is that the hooks 26 are arranged offset with respect to the longitudinal extension of the spreader member 16. This results in a favorable distribution of the forces gripping the belt webbing 10 to prevent the belt webbing 10 from tearing in this section.

Figure 6:
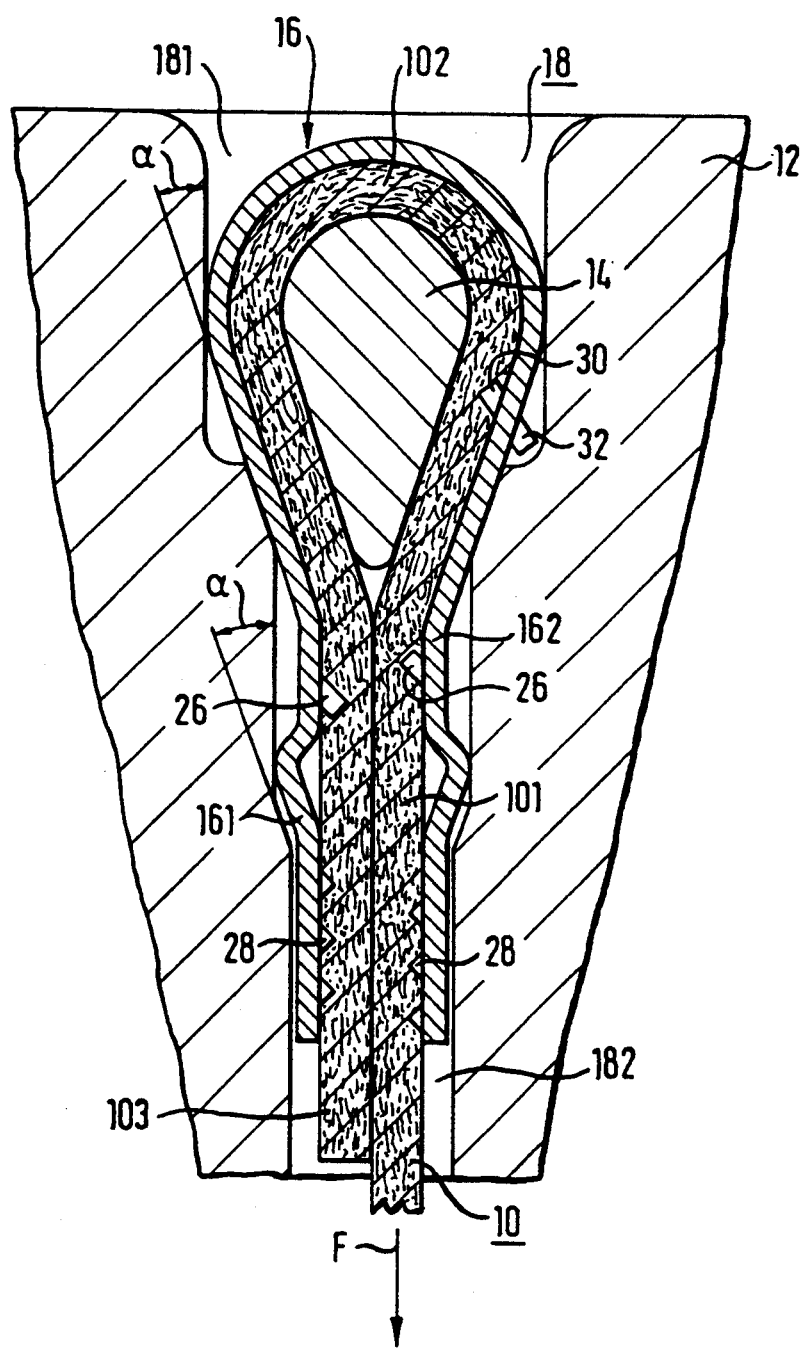
FIG. 6 is a partial cross-section view through the shaft of a belt retractor with an assembly for securing the belt webbing according to the invention in a fourth embodiment.

FIG. 6 shows yet a further embodiment of the invention. As already illustrated in FIGS. 2 to 5, here too the same reference numerals are used to identify parts having the same function. In this arrangement the belt webbing 10 directly locates a bar 14 oriented transversely to the longitudinal direction of the belt webbing F. In accordance with the embodiment of FIG. 1 the belt webbing 10 has a first section 101, a second section 102 and an end section 103. In this embodiment, however, the end section 103 is not wrapped around a region of the spreader member 16 again. Downstream of the bar 14 in the longitudinal direction of the belt webbing F the two sections 101 and 103 of the belt webbing 10 are pressed together.

The spreader member 16 is U-shaped and clasps the sections 101 to 103 and thus also the bar 14 surrounded by the belt webbing 10. The two arms 161 and 162 of the spreader member 16 are configured equally long and feature pointed hooks 26 on their inside surface which are configured according to the second embodiment and arranged on the spreader member 16. In addition, projecting ribs 28 are provided in the end region of the arms 161 and 162 transversely to the longitudinal direction of the belt webbing F.

In this embodiment the part 182 is formed wider than the sum of twice the thickness of the belt webbing 10, the thickness of the arm 161 and the thickness of the leg 162 of the spreader member 16. By contrast, the arms 161, 162 are formed outwardly vee-shaped at their centers. The wall defining the part 182 squeezes the arms 161, 162 together in this wedge-shaped intermediate region due to their absolute width being slightly more than the width of the part 182 of the slot 18. Via the width of the spreader member 16 in this region the squeezing force on the belt webbing can be easily adjusted.

In addition, the spreader member 16 features hooks 30 engaging the belt webbing 10 in the region of the bar 14 as well as projections 32 oriented outwardly. These projections 32 engage the first part 181 of the slot 18 and firmly locate the spreader member 16 in the axial direction.

FIG. 6 also indicates the angle a of the spreader member 16 and of the bar 14. This supporting angle a is made as obtuse as possible since the holding force of the belt webbing 10 is boosted exponentially, whereby the exponent is the angle of wrap. To increase the friction 1 the surface of the spreader member 16 and the supporting surfaces of the wall defining the slot 18 are provided roughened, for instance, by knurling the surface transversely to the belt webbing direction of pull F.

As immediately apparent from the drawing the assembly according to the invention permits simple installation, the bar 14, the belt webbing 10 wrapped around the bar 14 and the spreader member 16 being simply forced into the slot 18 as a single unit.

As a result of the assembly according to the invention the resistance of the belt webbing 10 to rupture as required by law is satisfied and its reliable fastening, i.e. the resistance of the belt webbing to becoming detached from the fastening arrangement is enhanced. The hooks 26, 28, 30 may also be formed with a sawtooth cross-section in a deviation from the embodiments shown.

What is claimed is:

1. An assembly for fastening an end of a seat belt webbing to a winding shaft provided with a radial slot through which said webbing end is inserted, said slot having a first, narrow portion and a second, wider portion connected to said first portion, a holding member extending in said wider slot portion in a direction transverse to a radial direction of said slot and provided with a web extending into said narrow slot portion, said webbing end having a first section for introduction into said slot through said narrow slot portion, a second section for wrapping around said holding member and extending along said web, and a third, end section folded back onto said web and engaged in a squeezed state between said web and said first webbing section.

2. The assembly of claim 1, wherein a plurality of projecting teeth are provided along a transverse edge of said web for penetration into said webbing in a region thereof interconnecting said second and third webbing sections.

3. The assembly of claim 1, wherein a plurality of projecting teeth are provided on a side face of said web for penetration into webbing of said third webbing section.

4. The assembly of claim 1, wherein said holding member and web are integrally made from a piece of sheet metal with a rolled portion forming said holding member and a flat portion forming said web.

5. An assembly for fastening an end of a seat belt webbing to a winding shaft provided with a radial slot through which said webbing end is inserted, said slot having a first, narrow portion and a second, wider portion connected to said first portion, a rod member extending in said wider slot portion in a direction transverse to a radial direction of said slot, said webbing end having a first section for introduction into said slot through said narrow slot portion, a second section for wrapping around said rod member and a third, end section extending parallel to and contacting said first webbing section, and a clamp extending around said first, second and third webbing sections and having a pair of webs forcingly engaged into said narrow slot portion holding said first and third webbing sections in a squeezed state between said pair of webs.

6. The assembly of claim 5, wherein each web is provided with a plurality of projecting teeth facing and penetrating into webbing of said first and third webbing sections.

7. The assembly of claim 5, wherein said clamp is made from a piece of sheet metal with a rolled portion interconnecting a pair of flat portions forming said webs.

* * * * *